(12) United States Patent
Borneman et al.

(10) Patent No.: US 7,040,645 B1
(45) Date of Patent: May 9, 2006

(54) HITCH RECEIVER

(75) Inventors: L. M. Skip Borneman, Roseau, MN (US); Steven W. Aronson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/376,445

(22) Filed: Feb. 28, 2003

(51) Int. Cl.
*B60D 1/52* (2006.01)
(52) U.S. Cl. .................................. 280/492; 280/491.5
(58) Field of Classification Search ............... 280/492, 280/493, 494, 495, 491.5, 498, 499
See application file for complete search history.

(56) References Cited

U.S. PATENT DOCUMENTS

| | | | |
|---|---|---|---|
| 2,189,667 A | 2/1940 | Kries | |
| 2,425,449 A * | 8/1947 | Wilson | 280/483 |
| 2,544,185 A * | 3/1951 | Sargent | 280/491.2 |
| 2,578,461 A | 12/1951 | Bachman | |
| 2,639,160 A | 5/1953 | Studebaker et al. | |
| 2,838,327 A * | 6/1958 | Collins | 280/491.2 |
| 2,867,452 A * | 1/1959 | Ricklick | 280/492 |
| 3,552,775 A | 1/1971 | Warner | |
| 3,560,013 A | 2/1971 | Lee | |
| 3,580,612 A * | 5/1971 | Pearson | 280/492 |
| 3,762,736 A | 10/1973 | Johnson et al. | |
| 3,781,038 A | 12/1973 | Bachel et al. | |
| 3,797,846 A | 3/1974 | Pevic | |
| 4,032,170 A | 6/1977 | Wood | |
| 4,388,012 A | 6/1983 | Erickson | |
| 4,548,423 A | 10/1985 | Craven | |
| 4,588,199 A | 5/1986 | Fisher | |
| 4,711,461 A * | 12/1987 | Fromberg | 280/494 |
| 5,536,032 A * | 7/1996 | Golson et al. | 280/515 |
| 5,645,292 A | 7/1997 | McWilliams et al. | |
| 5,685,554 A | 11/1997 | Poxleitner | |
| 5,853,187 A | 12/1998 | Maier | |
| 5,873,594 A * | 2/1999 | McCoy et al. | 280/491.5 |
| 6,173,984 B1 | 1/2001 | Kay | |
| 6,203,049 B1 * | 3/2001 | Gibson | 280/494 |

* cited by examiner

*Primary Examiner*—Kevin Hurley
(74) *Attorney, Agent, or Firm*—Baker & Daniels LLP

(57) ABSTRACT

A trailer hitch assembly including a mounting frame including a tubular receiver readily attachable to a chassis of a towing vehicle and a hitch mount assembly detachably coupled to the tubular receiver for free 360° horizontal rotation therein.

10 Claims, 6 Drawing Sheets

HITCH RECEIVER

FIELD OF THE INVENTION

The present invention relates to trailer hitch systems. More particularly, to quick release trailer hitch assemblies for pivotally connecting a towed object to a towing vehicle.

BACKGROUND

Snowmobiles are popular vehicles for use in snowy conditions and can be used for utilitarian or recreational purposes. Although primarily a recreational vehicle, snowmobiles are often relied upon for transportation in remote areas where road vehicles are disabled because of poor road conditions. When used as a primary mode of transportation, it is desirable that the snowmobile be capable of hauling a load, as for example, on a towed trailer. Additionally, it may be necessary to tow a disabled snowmobile from a remote area inaccessible to general road vehicles.

A typical snowmobile may be equipped with a hitch receiver mounted at the rear of the vehicle for coupling a towed object such as a trailer, other cargo transport, or a disabled snowmobile. Typical snowmobile hitch systems have been cumbersome to install and operate, requiring complicated mounting. Additionally, typical hitch receivers extend out from the body of the snowmobile thereby detracting from aesthetics and aerodynamic properties of the snowmobile.

Because snowmobiles are often operated on uneven terrain, excessive torsional forces can be applied to the portion of the snowmobile carrying the hitch receiver, damaging the snowmobile and placing the operator in danger.

Trailer hitch assemblies for coupling a towed object, such as a trailer or vehicle, to a towing vehicle are well known. Typical trailer hitch assemblies include a two part arrangement with a ball assembly mounted to the towing vehicle and socket assembly, for receiving the ball. Such a coupling is known as a ball and socket joint.

The traditional ball and socket trailer hitch systems have two major limitations. First, the ball and socket coupling produces excessive torsional and angular stresses on the bumper. During towing, over uneven terrain or when making turns or corners there is differential horizontal and vertical displacement between the towed object and the towing vehicle. Such stresses can be so severe as to damage the bumper, the trailer hitch, or both and place the driver in danger. Second, the ball and socket must be specifically mated, that is, the ball assembly is only capable of coupling a towed object equipped with a correctly sized socket assembly. Thus, when a trailer that is not equipped with a socket assembly is encountered either the trailer or vehicle hitch system must be altered.

A further shortcoming of prior art trailer hitch assemblies involves the often cumbersome and complicated manner in which the towed object is uncoupled from the towing vehicle. For example, in the traditional ball and socket hitch system, the tongue member of the towed object must be lifted upward to uncouple the socket. This is particularly cumbersome when a heavy load is towed. Often, the trailer must be provided with a jack to enable the operator to lift the socket off the ball.

With respect to hitch assemblies for snowmobiles in particular, it has often been necessary to change the hitch receiver to mate with the particular hitch mount provided on any particular towed object. This often involves disassembly of the rear bumper of the snowmobile and the drilling of multiple holes to accommodate various hitch receiver types. Such a system is undesirable especially if the snowmobile is used to tow a variety of trailers or other towable objects. Furthermore, the aesthetics of the snowmobile are compromised by the plurality of holes drilled in the chassis.

A number of developments have been made to improve the traditional ball and socket trailer hitch assembly. For example U.S. Pat. No. 4,548,423 discloses a universal trailer hitch assembly having a mounting block that receives a shaft member extending from a universal joint. The shaft is configured to be mounted to a towing vehicle between two blocks. A stationary block mounts to the towing vehicle and a removable block sandwiches the keyed shaft of the universal joint between itself and the stationary block to provide the coupling between the towed object and the towing vehicle. The rotation of the shaft member in the mounting block reduces torsional forces. To uncouple the towed object from the towing vehicle, tools are required to disconnect the shaft from the blocks.

U.S. Pat. No. 4,588,199 discloses a swivel connection for trailers adapted to be interposed between a motorcycle or other small vehicle and a trailer. The swivel connector is formed of an elongated hollow bar welded at one end to a socket portion of a trailer hitch assembly. An open ended box is welded within the interior of the hollow bar at an end opposite the socket. A spindle is welded within the open-ended box. The spindle of the socket portion of the hitch assembly is journalled in an open-ended sleeve provided on the tongue member of a trailer for horizontal rotation thereabout. Thus, to benefit from the degree of rotation afforded by the swivel connector, each trailer or towed object must be fitted with the swivel connector.

U.S. Pat. No. 3,797,846 discloses a tow bar with a pivotable tongue for coupling a snowmobile to be towed to a towing snowmobile. Torsional forces are reduced by providing a tongue with a threaded bolt mounted in the internal space of the tongue. The towing vehicle and towed object are coupled together via a threaded bolt that is received within the bolt of the tongue. Torsional forces are essentially taken up by the screwing and unscrewing (depending on the direction of the force) of the threaded bolt.

U.S. Pat. No. 3,552,775 discloses a trailer hitch coupling configured to reduce torsional forces. The coupling is comprised of a pintle formed with annular grooves. Annular rings sized to be received within the annular grooves allow the pintle to rotate against the annular rings. One end of the pintle is provided with metal plates for mounting to a traditional trailer hitch. The other end is received within a terminus of an auto tow bar. There is also provided a number of adaptors to adjust the pintle for use in varying sized and shaped receivers. While allowing for reduction in torsional forces, the coupling requires the use of inconvenient adapters, multiple parts, and is cumbersome to uncouple the towed object from the towing vehicle.

While there have been previous attempts to accommodate differential movement and torsional forces, none satisfy the requirement of simultaneously reducing torsional forces on the towing vehicle while being freely and easily interchangeable for use with a variety of tongue configurations provided on towable objects. Furthermore, none of the prior art assemblies provide for a convenient and efficient manner of uncoupling the towed object from the towing vehicle. There remains a need, therefore, for a trailer hitch system satisfying these requirements.

SUMMARY OF THE INVENTION

The present invention provides an improved hitch assembly for snowmobiles or other vehicles capable of towing a towable object. In accordance with one aspect there is provided a trailer hitch assembly that includes a cylindrical receiver mountable to a chassis of a towing vehicle. The assembly further includes a hitch mount assembly configured to be coupled to an object to be towed. The hitch mount assembly including a cylindrical member sized to be received in and traverse through the cylindrical receiver to allow for 360° axial rotation therein.

According to another aspect, there is provided a trailer hitch assembly including a mounting frame that is readily attachable to a chassis of a towing vehicle. The mounting frame includes a tubular receiver and a hitch mount assembly detachably coupled to the receiver. The hitch mount assembly includes a cylindrical member that is sized to be received in the cylindrical receiver and to extend through an open end of the receiver. The cylindrical member further includes two holes formed therethrough for receiving a pin for detachably securing the assembly to the receiver and preventing axial separation thereof. The holes are positioned so as to extend beyond an open end of the receiver so as to allow free rotation of the cylindrical member therein.

In accordance with another aspect of the present invention, there is provided a trailer hitch assembly that includes a mounting frame. The mounting frame includes two spaced apart arm members, each arm member including at least one hole formed therethrough. The holes are generally aligned with holes formed within a chassis of a towing vehicle for mounting a bumper to the vehicle, such that the mounting frame is attachable to the chassis without alteration to the towing vehicle. The mounting frame further includes a tubular receiver and a hitch mount assembly detachably connectable thereto. The hitch mount assembly includes a cylindrical member sized to be receivable through the receiver and freely rotatable therein. The hitch mount assembly further including means for securing an object to be towed.

In accordance with yet another aspect of the invention, there is provided a snowmobile including a longitudinally extending chassis including a front portion, a central portion, and a rear portion. The front chassis portion having an engine cradle for mounting an engine that powers a drive track. The front portion mounts a pair of steerable skis. The central portion includes a drive tunnel having the drive track disposed therein, the drive tunnel having opposing right and left generally vertical side walls and a top portion supporting an operator seat for accommodating an operator in straddle fashion.

The snowmobile further includes a hitch receiver mount rigidly secured to the drive tunnel, the hitch receiver mount including a cylindrical hitch receiver attached thereto, the cylindrical receiver including a first and second open end.

The hitch receiver includes a hitch mount assembly detachably connectable to the receiver. The hitch mount assembly includes a cylindrical member sized to be receivable through the receiver and freely rotatable in the tubular receiver. The cylindrical member further including two holes formed therethrough, the holes positioned so that they extend beyond the second open end of the cylindrical receiver.

DETAILED DESCRIPTION OF THE PREFERRED EMBODIMENTS

Figure 1:
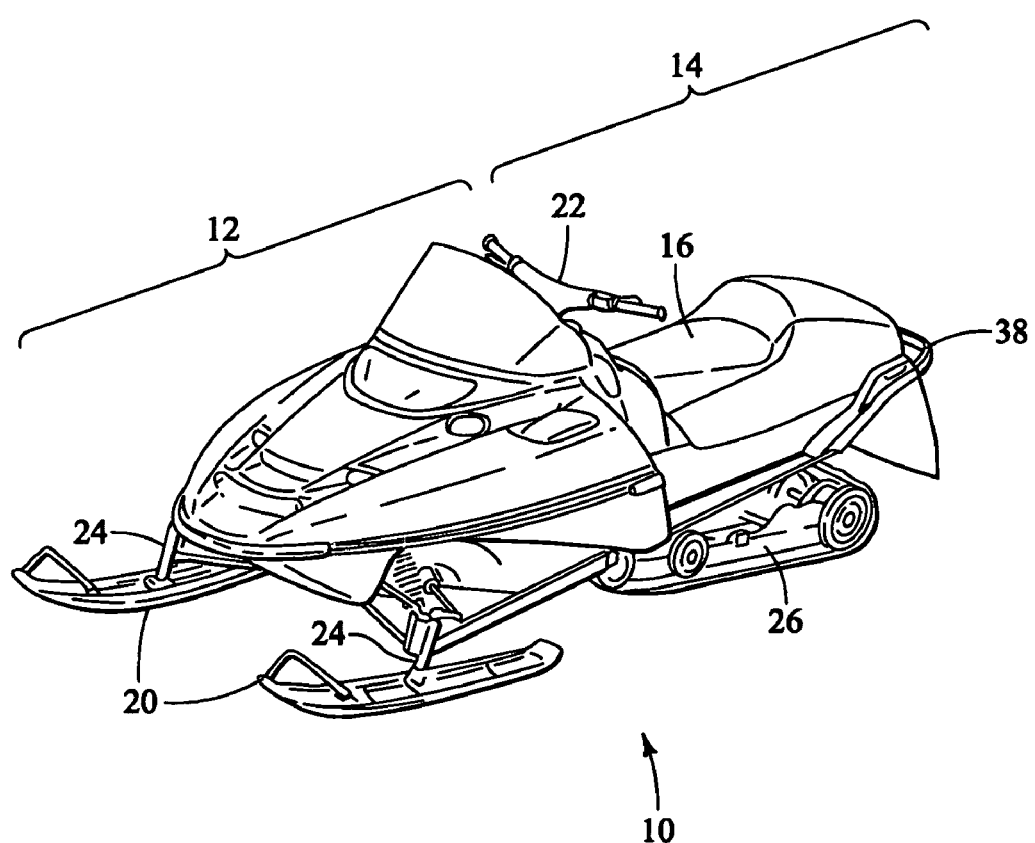
FIG. 1 depicts generally a snowmobile.

The drawings depict of a preferred embodiment of a snowmobile with the universal hitch receiver. It will be understood, however, that many specific details of the snowmobile hitch receiver illustrated in the drawings can be altered or modified by one of ordinary skill in the art without departing from the spirit of the invention. In particular, the universal hitch receiver may be used on other types of vehicles.

FIG. 1 depicts generally a typical snowmobile. The body of the snowmobile 10 includes a chassis (concealed by body panels and other snowmobile components) and provides a basic framework to which various components of the snowmobile may be mounted. The body of the snowmobile includes a front body portion 12 and a rear body portion 14. The rear body portion 14 includes a longitudinally extending seat 16 adapted to accommodate one or more riders in straddle fashion.

A pair of skis 20 are mounted at the front body portion 12 of the chassis. A handlebar assembly 22, positioned forward of the seat 16, is operatively linked to the skis 20 for steering the snowmobile 10. A front suspension system suspends the skis 20 mounted on suspension arms 24. The skis 20 and suspension arms 24 are constructed so that the skis 20 may be pivoted laterally to steer the snowmobile, for example, by turning the handlebars 22.

An engine compartment or bulkhead (not shown) is positioned at the front body portion 12. Rearwardly of the skis 20 and beneath the seat 16, the chassis suspends an endless track assembly 26, for propelling the snowmobile, from a rear suspension system (not shown). The endless track 26 is centrally mounted under the chassis in a longitudinally extending drive tunnel (not shown). The track system is driven by an engine positioned in the engine compartment (not shown).

Figure 2:
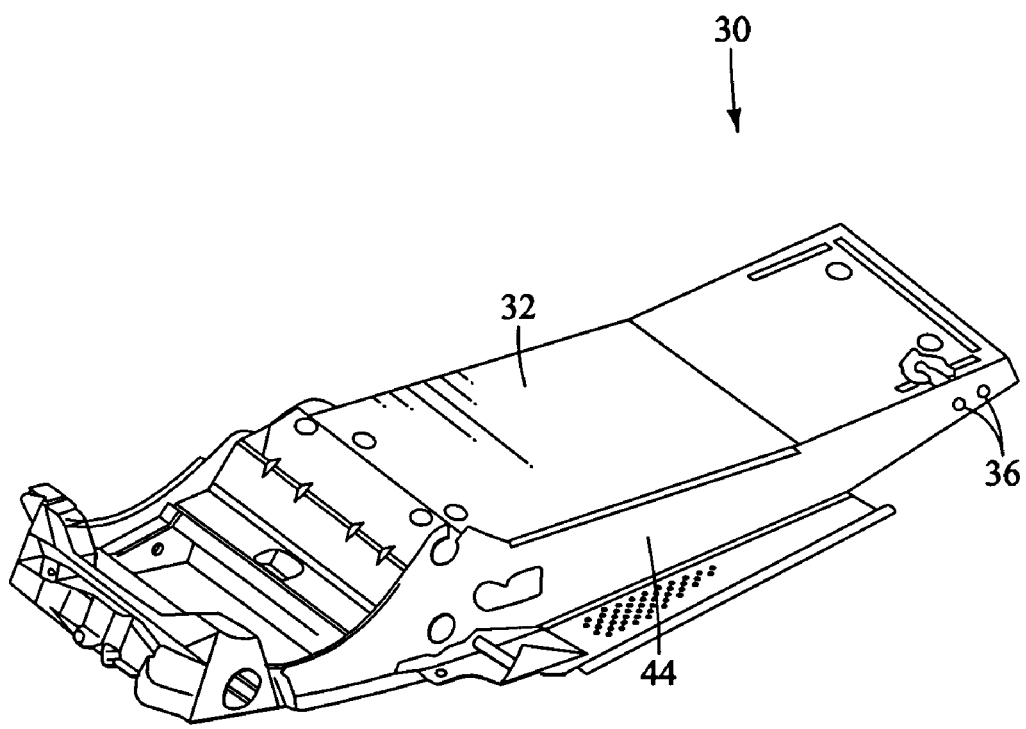
FIG. 2 depicts generally a tunnel of a snowmobile illustrating the points of attachment of the hitch receiver of the present invention.

FIG. 2 depicts a typical drive tunnel 30. The drive tunnel has a top portion 32 and two downwardly extending sidewalls 34 that are positioned on opposite sides of the endless track so that the endless track is disposed within the drive tunnel 30. At rearward portion of the drive tunnel a set of bolt holes 36 are provided for mounting a rear bumper 38 (see FIG. 1). As will be described further with respect to FIG. 4, the rear bumper mounting holes are also used to mount the hitch receiver of the present invention.

Figure 3:
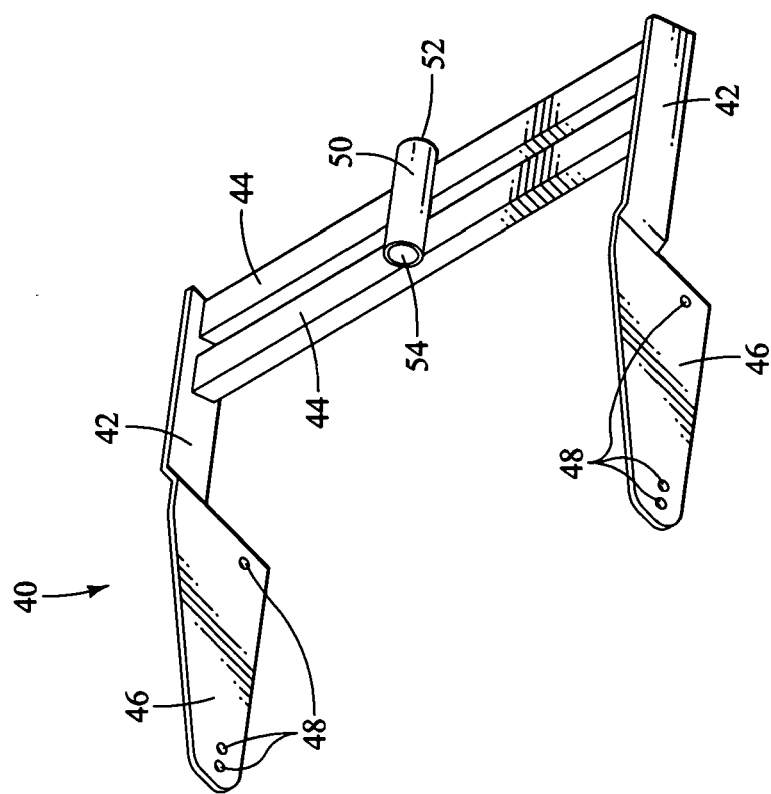
FIG. 3 is a bottom view of the cylindrical trailer hitch receiver mounting frame according to a preferred embodiment of the present invention.

As depicted in FIG. 3, hitch receiver mounting bracket 40 is generally U-shaped with two extending side arms 42 and two horizontally extending members 44. It will be appreciated by those skilled in the art that the bracket may be provided with a single horizontal member without departing from the scope of the present invention.

Each arm includes vertical side plates 46 for mounting to the chassis of a snowmobile. Each vertical side plate 46 includes holes 48 formed therethrough. The holes 48 are configured such they align with receiving holes 36 in the tunnel 30 that are used for securing the bumper 38 to the rear of the snowmobile 10. Holes 48 in the vertical side plates 46 can be provided in a variety of configurations and numbers dependent on the particular snowmobile being outfitted with the hitch receiver. The distance between the side arms 42 is generally equivalent to the width of the tunnel 30 of the snowmobile so that once attached, the mounting bracket does not alter the profile or aesthetics of the snowmobile. The side arms 42 may be dimensioned so that the hitch receiver mounting bracket 40 does not extend out beyond the bumper so as to maintain the aesthetics of the snowmobile.

Mounting bracket 40 further includes an open-ended tubular receiver member 50 rigidly attached to horizontally extending members 44 by means of welding or any other suitably strong attachment. The cylindrical receiver member 50 is generally a hollow tube with first and second open ends 52 and 54, respectively. A hitch mounting assembly is received within the cylindrical hitch receiver, as will be described further below.

Figure 4:
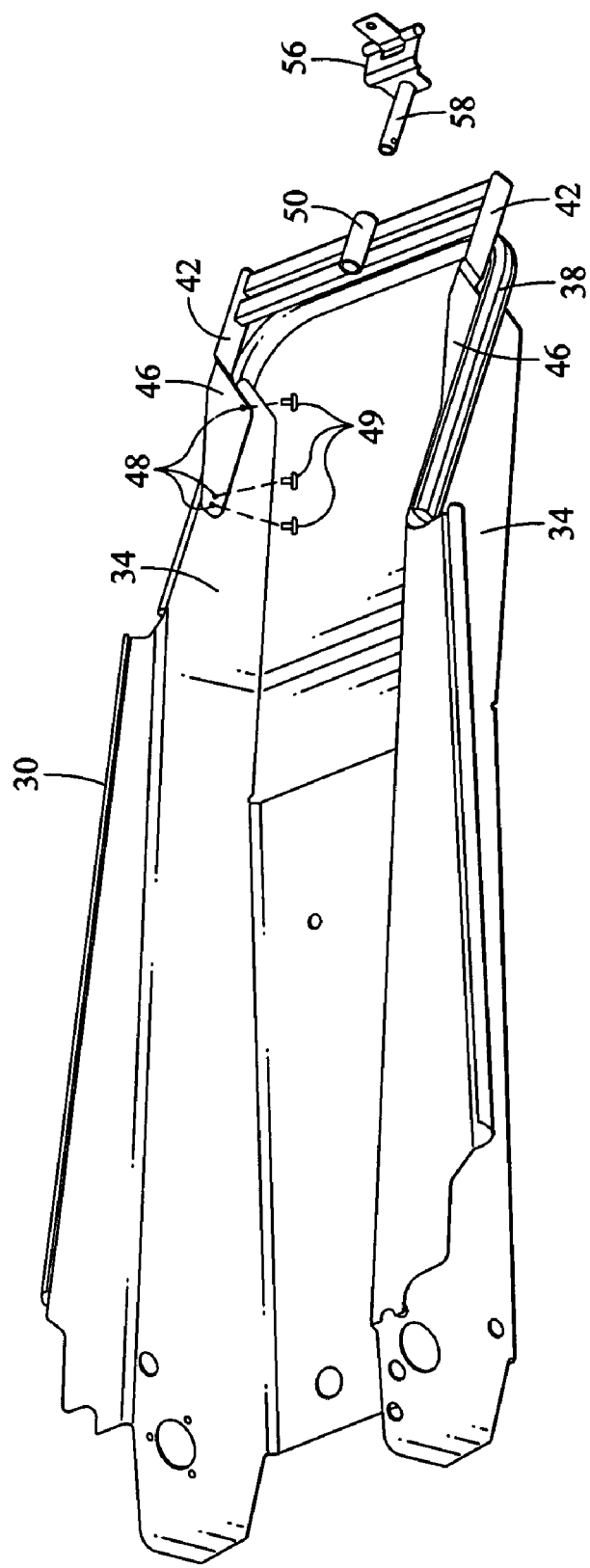
FIG. 4 is a bottom view of a typical snowmobile drive tunnel provided with the hitch assembly mounting frame according to a preferred embodiment.

As shown in FIG. 4, mounting bracket 40 may be attached to the drive tunnel 30 utilizing existing holes 36 formed on the downwardly extending sidewalls 34 for receiving bolts that secure the bumper 38 to the snowmobile. Thus, no alterations or new holes must be drilled to attach the hitch coupler of the present invention. The vertical side arms 42 are spaced apart from one another so that the space between the vertical side plates 46 is generally equal to width of the tunnel 30 at the point of attachment. The holes 48 formed in the vertical side plates 46 are aligned with the pre-existing holes 36 in the drive tunnel 30. Thus, to install the mounting bracket, bolts 49 securing the rear bumper 38 are removed, the mounting bracket 40 is slid into place so that the holes 48 formed within the vertical side plates 46 align with the existing holes 36 for mounting the bumper, the bumper replaced and the bumper securement bolts 49 are replaced. Thus, no cumbersome alterations need be made to the snowmobile. Additionally, since the present hitch receiver may be provided with a variety of hitch assemblies, the hitch receiver is universal and replacement is unnecessary. The mounting bracket and cylindrical receiver may be formed of steel or any other material suitable to withstand the forces that towing exerts upon the hitch receiver.

As can be seen in FIG. 4, once mounted, the mounting bracket 40 lies below the bumper 38. Alternatively, the mounting bracket 40 may be formed so that it doubles as a hitch receiver and bumper.

During towing over uneven terrain or when cornering or turning there are significant torsional forces exerted upon the towing vehicle. Such forces can be so severe as to twist the hitch assembly or the bumper to which it is secured. To accommodate such forces and reduce the torsional stress, the hitch assemblies 56 include a cylindrical member 58 for coupling to the hitch receiver 50 that rotates through 360° within the hitch receiver 50.

Figure 5A:
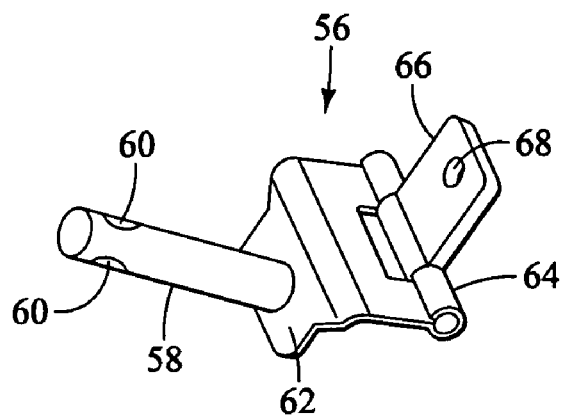
FIGS. 5a–5c illustrate hitch mount assemblies according to preferred embodiments of the present invention
Figure 5B:
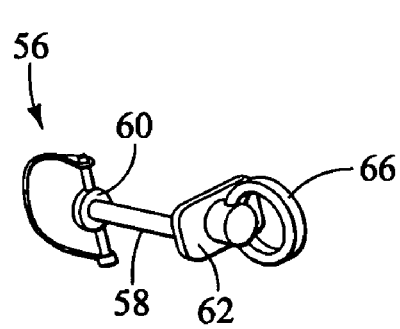
Figure 5C:
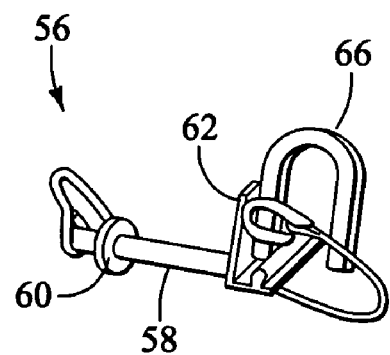

As illustrated in FIGS. 5a–5c, cylindrical member 58 includes two holes 60 formed near one end thereof. Holes 60 are formed at a position along the cylindrical member 58 such that they clear the second open end 54 of the cylindrical receiver 50 when inserted therein (shown in FIG. 6).

Cylindrical member 58 may be rigidly attached to a plate member 62 by welding or other suitable means. Plate member 62 acts as a stop to limit axial movement of the cylindrical member 58 within the cylindrical receiver 50. Additionally, plate member 62 may be attached to various tongue members 66 for coupling the towed object.

As shown in FIG. 5a, a tongue member 66 may be attached to the plate member 62 by means of a hinge 64. The hinge 64 allows for vertical isolation of the towed object relative to the towing vehicle. To facilitate coupling to the towed object, tongue member 66 may be provided with a hole 68 formed therethrough for receiving a bolt (not shown).

Tongue member may be provided in a variety of configurations to accommodate the varied styles of hitches provided on towed objects. For example, as illustrated in FIG. 5b, tongue member 66 may be essentially formed as a ring inserted through the plate member 62. Configuring the ring in this manner allows for vertical isolation of the towed object relative to the towing vehicle. Alternatively, as depicted in FIG. 5c, tongue member 66 may be provided in an essentially hook-like configuration. Although several hitch mount assembly configurations have been described, those skilled in the art will recognize that the hitch mount assembly can be provided with any number of configurations.

Figure 6:
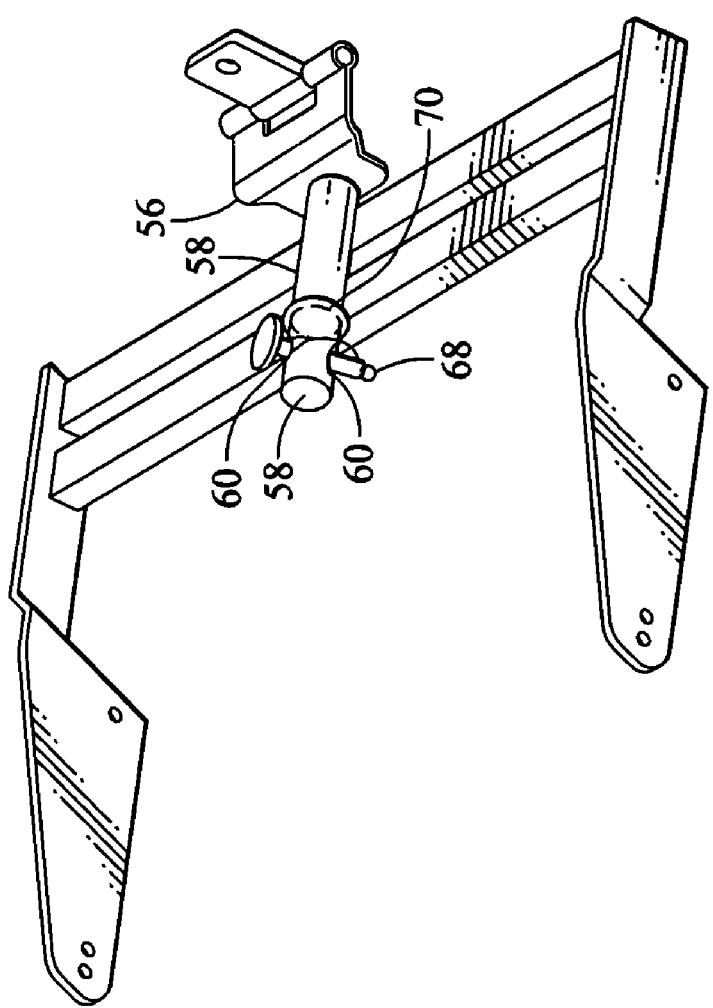
FIG. 6 illustrates the coupling of the cylindrical hitch receiver to a hitch mount assembly according to a preferred embodiment of the present invention.

Axial separation of the hitch mount assembly 56 and receiver 50 is prevented by means of a lynch pin 68, cotter pin, or other suitable means such as a bolt or any metal pin of sufficient tensile strength. As illustrated in FIG. 6, the cylindrical member 58 is inserted through the cylindrical receiver 50 so that the two holes 60 formed in the cylindrical member 58 extend beyond the second open end (not visible in FIG. 6) of the cylindrical receiver 50. A lynch pin 68 is inserted through the holes 60 to prevent axial separation. Alternatively, a washer 70 may be fitted around the cylindrical receiver before the lynch pin is inserted to distribute the load over the entire end of the receiver.

It is readily apparent that no tools are required to modify the hitch assembly of the present invention to accommodate varied hitch styles provided on towable objects. To adapt the hitch receiver to accommodate varied trailer hitches, one simply removes the lynch pin 68, removes the hitch mount assembly 56 from the receiver, inserts a new hitch mount assembly 56 and reinserts the lynch pin 68.

While preferred embodiments of the present invention have been described, it should be understood that various changes, adaptations, and modifications may be made without departing from the spirit of the invention and the scope of the appended claims.

What is claimed is:

1. A trailer hitch assembly and chassis combination comprising:
   a chassis having holes for mounting a bumper to the chassis;
   a mounting frame, including two spaced apart arm members, each arm member including at least one hole formed therethrough, wherein the holes are generally aligned with the holes formed within the chassis, such that the mounting frame is attachable to the chassis without alteration to the towing vehicle, the mounting frame including a tubular receiver; and
   a hitch mount assembly detachably connectable to the receiver, the hitch mount assembly including a cylindrical member sized to be receivable through the receiver and freely rotatable therein, the hitch mount assembly further including means for securing an object to be towed.

2. The universal trailer hitch assembly of claim 1, wherein the cylindrical member is a hollow tube with two holes formed therethrough, the holes formed so as to extend through an end of the hollow tube such that a securing pin can be extended through the two holes to secure the hitch mount assembly to the mounting frame.

3. The trailer hitch assembly of claim 1, wherein the hitch mount assembly further includes a plate member coupled to the cylindrical member for limiting axial movement of the cylindrical member within the cylindrical receiver.

4. The trailer hitch assembly of claim 3, wherein the plate member includes a tongue member hingedly attached to the plate member for coupling a towable object.

5. The trailer hitch assembly of claim 4, wherein the tongue member is generally a ring.

6. A snowmobile comprising:

a longitudinally extending chassis including a front portion, a central portion, and a rear portion, the front chassis portion having an engine cradle for mounting an engine that powers a drive track, the front portion mounting a pair of steerable skis, the central portion including a drive tunnel having the drive track disposed therein, the drive tunnel having opposing right and left generally vertical side walls and a top portion supporting an operator seat for accommodating an operator in straddle fashion;

a hitch receiver mount rigidly secured to the drive tunnel, the hitch receiver mount including a cylindrical hitch receiver attached thereto, the cylindrical receiver including first and second open ends; and a hitch mount assembly detachably connectable to the receiver, the hitch mount assembly including a cylindrical member sized to be receivable through the receiver, wherein the cylindrical member includes two holes formed therethrough, the holes positioned so that they extend beyond the second open end of the cylindrical receiver when the hitch mount assembly is coupled to the hitch receiver, the holes receiving a pin which prevents axial separation of the cylindrical receiver and cylindrical member while allowing the cylindrical member to be freely rotatable in the cylindrical receiver.

7. The snowmobile of claim 6, wherein the hitch receiver mount includes two side arms spaced apart by two horizontal members and two vertical side plates formed on the side arms, wherein the cylindrical receiver is coupled to the horizontal members.

8. The snowmobile of claim 7, wherein the hitch mount assembly further includes a plate member coupled to the cylindrical member for limiting axial movement of the cylindrical member within the cylindrical receiver.

9. The snowmobile of claim 8, wherein the plate member includes a tongue member hingedly coupled thereto for coupling a towable object.

10. The snowmobile of claim 9, wherein the tongue member is selected from a group consisting of a ring, a hook, or a bolt receiving plate.

* * * * *